US011074524B2

(12) United States Patent
Guo et al.

(10) Patent No.: US 11,074,524 B2
(45) Date of Patent: Jul. 27, 2021

(54) DETERMINING A STATUS TO SECURE AN EVENT TICKET

(71) Applicant: STUBHUB, INC., San Francisco, CA (US)

(72) Inventors: Qing Guo, Fremont, CA (US); Sudhir Kishan Shivakumar, Fremont, CA (US)

(73) Assignee: StubHub, Inc., San Francisco, CA (US)

( * ) Notice: Subject to any disclaimer, the term of this patent is extended or adjusted under 35 U.S.C. 154(b) by 525 days.

(21) Appl. No.: 14/534,063

(22) Filed: Nov. 5, 2014

(65) Prior Publication Data

US 2016/0125322 A1    May 5, 2016

(51) Int. Cl.
*G06Q 10/02*    (2012.01)

(52) U.S. Cl.
CPC .................................. *G06Q 10/02* (2013.01)

(58) Field of Classification Search
CPC .... G06Q 10/02; G06Q 30/06; G06Q 30/0633; G06Q 30/0631; G06Q 30/0275; G06Q 30/0222; G06Q 30/0224
USPC ............................................................ 705/5
See application file for complete search history.

(56) References Cited

U.S. PATENT DOCUMENTS

| | | | | |
|---|---|---|---|---|
| 6,980,966 B1 * | 12/2005 | Sobrado | ................. | G06Q 30/06 705/26.3 |
| 2003/0093306 A1 * | 5/2003 | Onoyama | ............... | G06Q 30/08 705/5 |
| 2007/0245351 A1 * | 10/2007 | Sussman | ................... | G06F 9/50 718/104 |
| 2009/0076926 A1 * | 3/2009 | Zinberg | ............. | G06Q 30/0601 705/26.1 |
| 2011/0264555 A1 * | 10/2011 | Turner-Rielle | ........ | G06Q 30/06 705/26.8 |
| 2011/0301986 A1 * | 12/2011 | Pappas | ................... | G06Q 10/02 705/6 |
| 2012/0166268 A1 * | 6/2012 | Griffiths | ............. | G06Q 30/0222 705/14.23 |

(Continued)

FOREIGN PATENT DOCUMENTS

AU        2013204589 A1 * 10/2014

OTHER PUBLICATIONS

"E-commerce incentives to increase sales and customer satisfaction." Feb. 19, 2009. The IP.com Journal, https://priorart.ip.com/IPCOM/000179640. (Year: 2009).*

*Primary Examiner* — John P Go
*Assistant Examiner* — Hunter A Molnar
(74) *Attorney, Agent, or Firm* — McDermott Will & Emery LLP (57) ABSTRACT

There is provided systems and methods for securing an event ticket. A processing module of a server device may access a first data packet associated with a first account and a second data packet associated with a second account. A status module of the server device may determines from the first data packet a first status of the first account attempting to secure an event ticket. The status module may further determine from the second data packet a second status of the second account attempting to secure the event ticket. A device module of the server device may determine from the first data packet an identification of a client device accessing the first account. A communication module of the server device may transmit the second status of the second account to the client device.

20 Claims, 7 Drawing Sheets

(56) References Cited

U.S. PATENT DOCUMENTS

| | | | |
|---|---|---|---|
| 2012/0221362 A1* | 8/2012 | Nezer | G06Q 10/02 705/5 |
| 2013/0173426 A1* | 7/2013 | Deutscher | G06Q 20/102 705/26.41 |
| 2013/0238467 A1* | 9/2013 | Iwabuchi | G06Q 10/00 705/26.62 |
| 2013/0268899 A1* | 10/2013 | Valentino | G06Q 30/0641 715/852 |
| 2014/0052571 A1* | 2/2014 | Raman | G06Q 20/123 705/26.8 |
| 2014/0067581 A1* | 3/2014 | Yamahara | G06Q 30/0601 705/26.1 |
| 2014/0095223 A1* | 4/2014 | Oxenham | G06Q 10/02 705/5 |
| 2014/0129266 A1* | 5/2014 | Perl | G06Q 30/02 705/5 |
| 2014/0142994 A1* | 5/2014 | Matarazzi | G06Q 50/01 705/5 |
| 2014/0195304 A1* | 7/2014 | Stein | G06Q 30/06 705/7.35 |
| 2014/0278595 A1* | 9/2014 | Werneke | G06Q 10/02 705/5 |
| 2015/0120343 A1* | 4/2015 | Burger-Lenehan | G06Q 30/06 705/5 |
| 2015/0127392 A1* | 5/2015 | Shivakumar | G06Q 50/01 705/5 |
| 2015/0205894 A1* | 7/2015 | Faris | G06Q 30/0207 703/21 |

* cited by examiner

DETERMINING A STATUS TO SECURE AN EVENT TICKET

TECHNICAL FIELD

This disclosure generally relates to event tickets, and more particularly, to computing devices configured to provide information related to event tickets.

BACKGROUND

Event tickets may be purchased for the movies, concerts, sporting events, comedic performances, and the like. Often, event tickets are purchased before the date of the event. To obtain event tickets, it may be possible to inquire into the location of the venue, parking at the venue, and available seats at the venue. In addition, it may be possible to inquire into particular seats in a given section or row of the event, the price of tickets for the seats, and a comparison between the price of the tickets and prices of other tickets, among other possibilities. Thus, such information may be used to decide which event tickets to secure.

In some instances, a fan of a certain music group may use an event-ticket service (e.g., STUBHUB®, of San Francisco, Calif.) to find tickets to an upcoming show. The fan may use the service to search for a ticket, identify a ticket that the fan wishes to purchase, and proceed to "check-out." Yet, as the fan is filling out forms and/or providing information to purchase the ticket, a second fan that wishes to purchase the same ticket may enter the required information faster than the first fan. As such, the second fan may purchase the ticket, possibly leaving the first fan frustrated, looking for other available tickets. In some instances, this first fan may have to re-start the purchasing process by searching for another ticket and filling out the forms all over again. Eventually, the service may notify this fan that the tickets to the show are sold out. This may occur for many events with high demand listings where available tickets may be sold out in just a few minutes. In some instances, fans may not be able to obtain tickets leading up to the start of an event when numerous fans may be rushing to purchase tickets just before the event begins. As such, this may result in unpleasant experiences for consumers and possibly loss of sales for the events.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In various embodiments, a system may provide real-time updates and recommendations to fans, e.g., general users, interested in securing event tickets. Further, such updates and recommendations may indicate the number of fans viewing a given event ticket. The system may also provide updates regarding the number of fans proceeding to check out to secure the event ticket. Further, the updates may indicate how far along the fans are in the check-out process, possibly in a timeline. Yet further, the updates may indicate that the tickets will be purchased soon and/or possibly that the tickets have been sold. In addition, the system may provide recommendations indicating other available tickets similar to the event ticket that a particular fan may also be interested in. For example, a first fan may select an event ticket and start the payment process for securing the event ticket. Further, a second fan may also start the payment process for the same event ticket, possibly securing the event ticket before the first fan. Yet, the system may allow the first fan to purchase a recommended event ticket without entering or re-entering the required payment information for securing the recommended ticket and/or starting the payment process over again. In some instances, the recommend ticket may be one that the fan may be more likely to secure, possibly an event ticket that other fans are not likely to view. For example, the system may identify the recommended ticket as one that is not being viewed, checked out, and/or attempted to be secured by other fans.

In some embodiments, event tickets may be represented by packets of data, possibly referred to as "data packets." In this case, a server may manage data packets indicative of multiple event tickets, and the server may transmit such data to a client device (e.g., a portable communication device). For example, consider a scenario where a fan of a particular event uses an event ticket service to search for available tickets to the event. In some instances, the fan may search for the particular event using a portable communication device. The server device may transmit to the portable communication device the data packets indicating the available event tickets. As such, the available event tickets may be shown on a display of the portable communication device.

Figure 1:
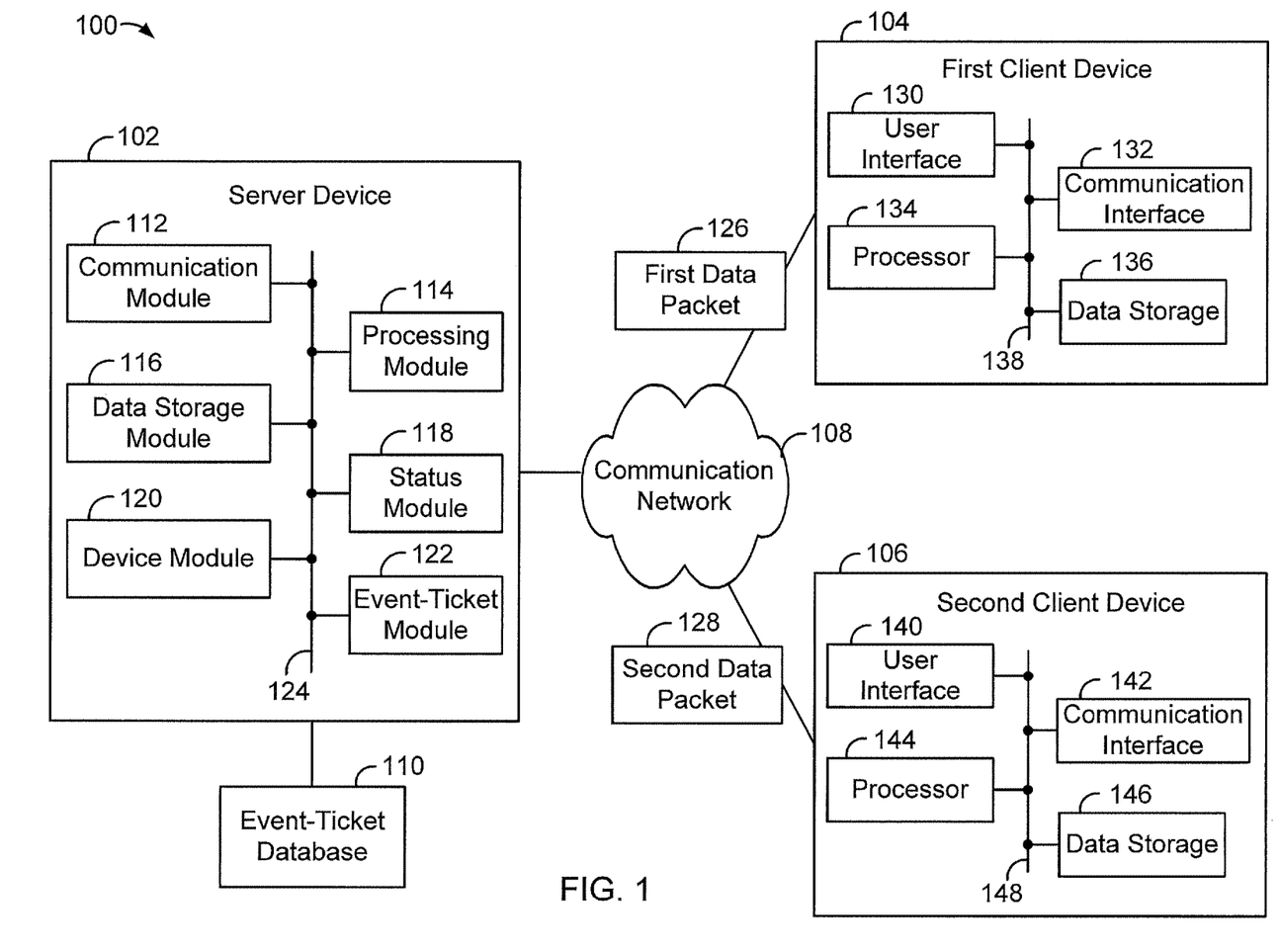
FIG. 1 is a simplified block diagram of an example system, according to an embodiment.

FIG. 1 is a simplified block diagram of an example system 100, according to an embodiment. As shown, system 100 includes multiple computing devices, such as a server device 102, a first client device 104, also referred to as "client device 104," and a second client device 106, also referred to as "client device 106." Server device 102 may be configured to support, operate, run, and/or manage an event-ticket service. As such, also included in system 100 are a communication network 108 and an event-ticket database 110. System 100 may operate with more or less than the computing devices shown in FIG. 1, possibly communicating with such devices via a communication network 108. Generally, server device 102, client device 104, and client device 106 are configured to communicate with each device via the communication network 108.

Communication network 108 may be a packet-switched network configured to provide digital networking communications and exchange data of various forms, content, type, and/or structure. Communication network 108 may correspond to small scale communication networks, such as a private or local area network, or a larger scale network, such as a wide area network or the Internet, accessible by the various components of system 100. Communication network may include network adapters, switches, routers, network nodes, and various buffers and queues to exchange data packets. For example, communication network 108 may be configured to carry data packets such as a first data packet 126 and a second data packet 128. Communication network 108 may exchange such packets between server device 102, client device 104, and client device 106 using various protocols such as Transmission Control Protocol/Internet Protocol (TCP/IP), among other possibilities.

System 100 may also comprise other computing devices or implement software components that operate to perform various methodologies in accordance with the described embodiments. For example, system 100 may include other client devices, stand-alone and/or enterprise-class servers possibly implementing MICROSOFT®, UNIX®, LINUX®, or another client- and/or server-based operating system. It can be appreciated that the client devices and/or server devices illustrated in FIG. 1 may be deployed in other ways and that the operations performed and/or the services provided by such client devices and/or server devices may be combined or separated for a given embodiment and may be performed by a greater number or fewer number of devices and/or servers. One or more devices and/or servers may be operated and/or maintained by the same or different entities.

System 100 includes server device 102 that may be configured for performing a variety of functions, such as those described in this disclosure (including the accompanying drawings). For example, the server device 102 may be configured to access data packets indicative of event tickets and determine statuses of accounts attempting to secure event tickets. Further, server device 102 may be configured to support, operate, run, and/or manage an event-ticket service for securing the event tickets.

An event-ticket account, or simply an "account," may provide access to event tickets, possibly for securing event tickets. Further, an account may be a compilation of data used to secure event tickets through an event-ticket service. For example, an account for a particular fan may include data related to the fan and/or data representing the fan. Further, the fan may provide relevant information to the account for securing event tickets. As such, the account may be displayed on a computing device, such as a mobile phone, laptop computer, or wearable computing device that may be used to access their account. As such, the account holder may operate the computing device and their account may be provided on the computing device. For example, the computing device may be used to receive data, send data, and/or store data for securing an event ticket for the account. For example, details regarding a particular event ticket may be viewed on the computing device. Further, login information may be provided to authenticate the account and payment information may be provided to secure the event ticket for the account.

In some instances, a fan may provide to the account the names of movies, sporting teams, music groups, and/or comedians that the fan may be interested in. Further, the event-ticket service may gather data regarding the fan and compile the data into the fan's account. In particular, the service may track previous purchases of event tickets and particular seats secured for a given venue, possibly indicative of future events that the fan may be interested in. Further, the service may track how long it takes the fan to secure event tickets such that the service may provide recommendations when the fan is viewing tickets viewed by another account. Some examples of accounts may include financial accounts, e-mail accounts, social networking accounts, and/or accounts with service providers, among other possibilities.

An account may be created by one or more entities using the event-ticket service, also possibly referred to as account owners and/or account holders. Further, an account may be created by the account holder, by the event-ticket service, and/or by other services. For example, the account may be created via applications, web sites, and/or other ticket services, for instance. In some instances, an account holder may be one or more fans with access to a particular account. For example, an account holder may have login and password information to access the account. Further, an account holder may be an entity, a body, and/or a corporation, among other possibilities. For example, an account holder may be a corporation with access to a corporate account to secure event tickets, possibly for its employees and/or contractors. Yet further, an account holder may be a computing device, a computing system, a robotic system, and/or another form of technology capable of sending and receiving information using the account, possibly to secure event tickets for the account.

An account holder may have a single account providing a representation of the account holder for an event-ticket service among multiple other services, websites, applications, etc. For instance, an account holder could opt to use their e-mail account or social network account as a common login for event-ticket services, among other online applications, which are provided by a number of different services. An account holder may attempt to secure an event ticket for an account. For example, the account holder may search for event tickets to a particular event. Further, the account holder may select one or more event tickets. In some instances, the account holder may be prompted for login and/or authentication information and thereby submit the requisite information to proceed with securing the event tickets. In addition, the account holder may prompted for payment and/or delivery information and thereby submit the requisite information to proceed with securing the event ticket, possibly to receive confirmation information for securing the event tickets.

Server device 102 may take a variety of forms and may include various components, including for example, a communication module 112, a processing module 114, a data storage module 116, a status module 118, a device module 120, and an event-ticket module 122, any of which may be communicatively linked to the other modules via a system bus, network, or other connection mechanism 124.

Communication module 112 may take a variety of forms and may be configured to allow the server device 102 to communicate with one or more devices according to any number of protocols. For instance, communication module 112 may be configured to allow server device 102 to communicate with client devices 104 and/or 106 via communication network 108. In one example, communication module 112 may take the form of a wired interface, such as an Ethernet interface. As another example, communication module 112 may take the form of a wireless interface, such as a cellular interface, a WI-FI interface, another short-range, point-to-multipoint voice and/or data transfer communication interface, such as BLUETOOTH.

In some instances, communication module 112 may transmit the status of an account to client devices 104 and/or 106. For example, communication module 112 may transmit the second status of the second account to first client device 104 and the first status of the first account to second client device 106.

Processing module 114 may include or take the form of a general purpose processor (e.g., a microprocessor) and/or a special purpose processor such as a digital signal processor (DSP). As such, processing module 114 may access first data packet 126 associated with a first account to an event-ticket service. Further, processing module 114 may access second data packet 128 associated with a second account to the event-ticket service. First data packet 126 and second data packet 128 may travel over communication network 108. Further, data packets 126 and 128 may include IP addresses of client device 104 and 106, respectively. Yet further, data packets 126 and 128 may also include data in protocols such as Transmission Control Protocol/Internet Protocol (TCP/IP). In various embodiments, each of packets 126 and 128 may include 1,000 to 1,500 bytes, among other possible ranges.

Data storage module 116 may include one or more volatile, non-volatile, removable, and/or non-removable storage components, such as magnetic, optical, or flash storage, and may be integrated in whole or in part with processing module 114. Further, the data storage module 116 may include or take the form of a non-transitory computer-readable storage medium, having stored thereon machine-readable instructions (e.g., compiled or non-compiled program logic and/or machine code) that, when executed by server device 102, cause the server device 102 to perform operations, such as those described in this disclosure.

Status module 118 may determine, from data and/or data packets, statuses of accounts attempting to secure a particular event ticket or a number of event tickets. Status module 118 may include pre-configured and dedicated circuits and/or hardware components of server device 102 to determine one or more statuses of accounts, or may include circuits and/or hardware components that are configured as needed. For example, status module 118 may determine from first data packet 126 a status of a first account attempting to secure an event ticket. Yet further, status module 118 may determine from second data packet 128 another status of a second account attempting to secure the same event ticket. The status of the first account may be referred to as a "first" status and the status of the second account may be referred to as a "second" status.

Device module 120 may determine, from data packets, identifications of client devices accessing accounts attempting to secure a particular event ticket or a number of event tickets. Device module 120 may include pre-configured and dedicated circuits and/or hardware components of server device 102 to determine identifications of client devices, or may include circuits and/or hardware components that are configured as needed. For example, device module 120 may determine from first data packet 126 an identification of client device 104 accessing the first account, possibly in an attempt to secure the same event ticket that a second account is also attempting to secure.

Event-ticket module 122 may determine data associated with an event ticket and locate one or more other event tickets from an event-ticket database. Event-ticket module 122 may include pre-configured and dedicated circuits and/or hardware components of server device 102 to determine data associated with one or more event tickets, or may include circuits and/or hardware components that are configured as needed. For example, event-ticket module 122 may have access to event-ticket database 110 that may include event-ticket data identifying the available event tickets for one or more events. Event-ticket module 122 may search the event-ticket database 110, possibly to search and identify event tickets by price, venue location, event date, event time, section, row, and seat identifications, among other possibilities.

As with server device 102, client devices 104 and 106 may be configured to perform a variety of operations such as those described in this disclosure. For example, client devices 104 and 106 may be configured to exchange data packets with the server device 102 such as data packets 126 and 128 indicating statuses of accounts for securing event tickets.

Client devices 104 and 106 may take a variety of forms, including for example, a personal computer (PC), a smart phone, a laptop/tablet computer, a smart watch with appropriate computer hardware resources, a head-mountable display, other type of wearable computing device, and/or other types of computing devices capable of transmitting and/or receiving data, among other possibilities. Client devices 104 and 106 may include various components, including, for example, user interfaces 130 and 140, communication interfaces 132 and 142, processors 134 and 144, and data storages 136 and 146, respectively, all of which may be communicatively linked with each other via a system bus, network, or other connection mechanisms 138 and 148, respectively.

User interfaces 130 and 140 may be configured for facilitating interaction between client devices 104 and 106 and users of client devices 104 and 106, and/or account holders accessing their accounts via client devices 104 and 106. For example, user interfaces 130 and 140 may be configured to receive input from an account holder and providing output to the account holder. Thus, user interfaces 130 and 140 may include input components such as a computer mouse, a keyboard, a touch sensitive panel, or perhaps a microphone for receiving voice commands. In addition, user interfaces 130 and 140 may include output components such as display screens (which, for example, may be combined with a touch sensitive panel), a sound speaker or other audio output mechanism, and a haptic feedback system.

Communication interfaces 132 and 142 may take a variety of forms and may be configured to allow client devices 104 and 106 to communicate with one or more devices according to any number of protocols. For instance, communication interfaces 132 and 142 may be configured to allow client devices 104 and 106, respectively, to communicate with the server device 102 via the communication network 108. Further, the communication module 112 may take the form of a wired or wireless interface.

Processors 134 and 144 may include general purpose processors and/or special purpose processors. Data storages 136 and 146 may include one or more volatile, non-volatile, removable, and/or non-removable storage components, and may be integrated in whole or in part with processors 134 and 144, respectively. Further, data storages 136 and 146 may take the form of non-transitory computer-readable storage mediums, having stored thereon machine-readable instructions that, when executed by processors 134 and 144, cause client devices 104 and 106 to perform operations, respectively, such as those described in this disclosure. Such machine-readable instructions may define or be part of a discrete software application, such a native app or web app that can be executed upon user request for instance.

Figure 2A:
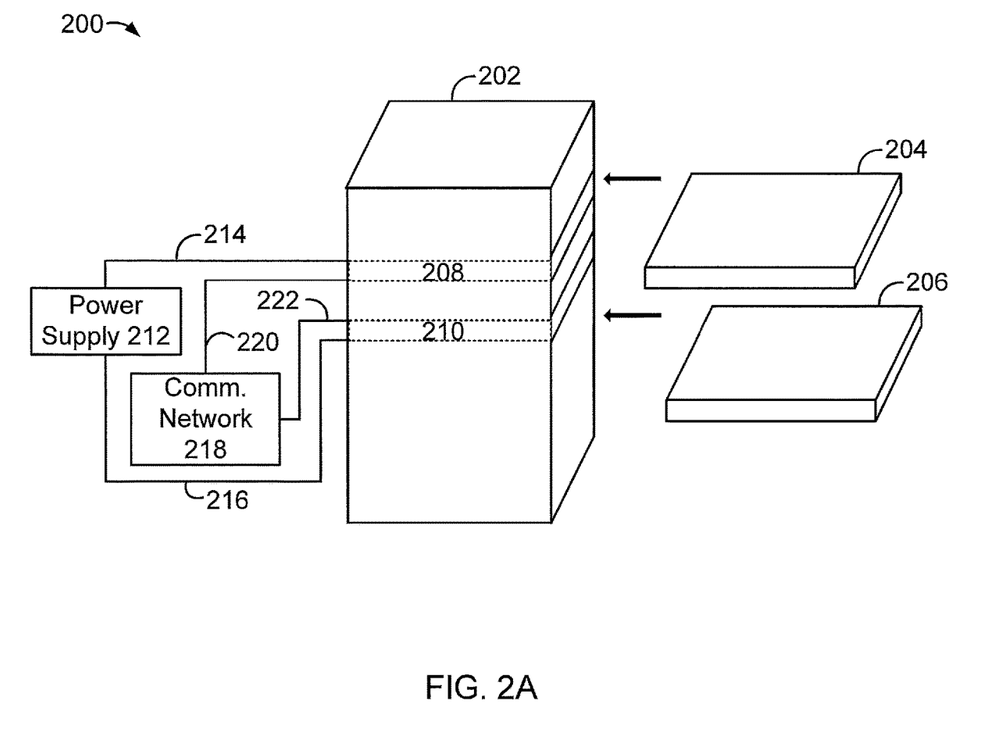
FIG. 2A is an exemplary server device configured to support a set of trays, according to an embodiment.

FIG. 2A. is an exemplary server device 200 configured to support a set of trays, according to an embodiment. Server device 200 may, for example, take the form of server device 102 described above in relation to FIG. 1. Further, server device 200 may be configured to support, operate, run, and/or manage an event-ticket service.

As shown, server device 200 may include a chassis 202 that may support trays 204 and 206, and possibly multiple other trays as well. Chassis 202 may include slots 208 and 210 configured to hold trays 204 and 206, respectively. For example, tray 204 may be inserted into slot 208 and tray 206 may be inserted into slot 210. Yet, slots 208 and 210 may be configured to hold trays 204 and 206 interchangeably such that slot 208 may be configured to hold tray 206 and slot 210 may be configured to hold tray 204. For example, tray 204 may be inserted into slot 208 and tray 206 may be inserted into slot 210. Further, during operation of server device 200, trays 204 and 206 may be removed from slots 208 and 210, and tray 204 may be inserted into slot 210 and tray 206 may be inserted into slot 208.

Chassis 202 may be connected to a power supply 212 via connections 214 and 216 to supply power to slots 208 and 210, respectively. Chassis 202 may also be connected to communication network 218 via connections 220 and 222 to provide network connectivity to each of slots 208 and 210, respectively. As such, trays 204 and 206 may be inserted into slots 208 and 210, respectively, and power supply 212 may supply power to trays 204 and 206 via connections 214 and 216, respectively. Further, trays 204 and 206 may be inserted into slots 210 and 208, respectively, and power supply 212 may supply power to trays 204 and 206 via connections 216 and 214, respectively. Yet further, communication network 218 may provide network connectivity to trays 204 and 206 via connections 220 and 222, respectively. In addition, communication network 218 may provide network connectivity to trays 204 and 206 via connections 222 and 220, respectively.

Communication network 218 may, for example, take the form of communication network 108 described above in relation to FIG. 1. In some embodiments, communication network 218 may provide a network port, a network hub, a network switch, or a network router that may be connected to a telephone, Ethernet, or an optical communication link, among other possibilities.

Figure 2B:
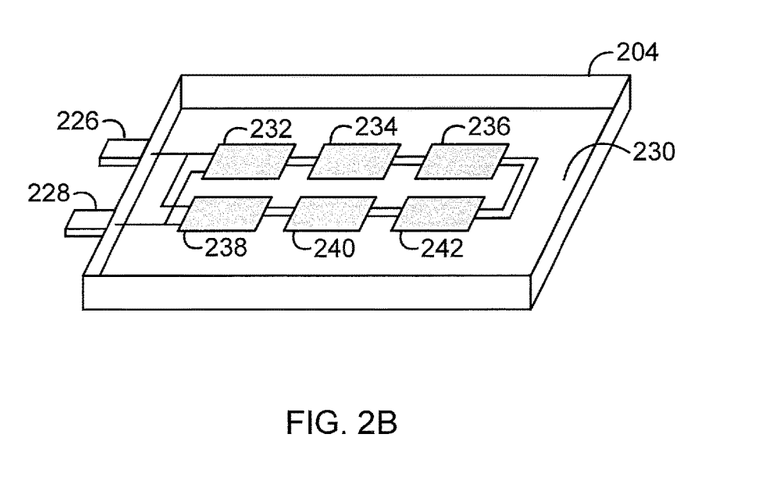
FIG. 2B is an exemplary tray configured to support one or more modules, according to an embodiment.

FIG. 2B. is an exemplary tray 204 configured to support one or more modules, according to an embodiment. Tray 204 may, for example, take the form of tray 204 described in relation to FIG. 2A. Further, tray 206 may also take the form of tray 204. As shown, tray 204 may include tray base 230 that may be the bottom surface of tray 204 configured to support multiple components such as a main computing board connecting one or more modules. Tray 204 may include connector 226 that may link to connections 214 or 216 to supply power to tray 204. Tray 204 may also include connector 228 that may link to connections 220 or 222 to provide network connectivity to tray 204. Connectors 226 and 228 may be positioned on tray 204 such that upon inserting tray 204 into slot 208, connectors 226 and 228 couple directly with connections 214 and 220, respectively. Further, upon inserting tray 204 into slot 210, connectors 226 and 228 may couple directly with connections 216 and 222, respectively.

Tray 204 may include modules 232-242. In some instances, a communication module 232, a processing module 234, a data storage module 236, a status module 238, a device module 240, and an event-ticket module 242 may, for example, take the form of communication module 112, processing module 114, data storage module 116, status module 118, device module 120, and event-ticket module 122, respectively. As such, tray 204 may provide power and network connectivity to each of modules 232-242. In some embodiments, one or more of the modules 232-242 may be provided via one or more circuits that include resistors, inductors, capacitors, voltage sources, current sources, switches, logic gates, registers, and/or a variety of other circuit elements. One or more of the circuit elements in a circuit may be configured to provide the circuit(s) that cause one or more of the modules 232-242 to perform the operations described herein. As such, in some embodiments, preconfigured and dedicated circuits may be implemented to perform the operations of the modules 232-242. In other embodiments, a processing system may execute instructions on a non-transitory, computer-readable medium to configure one or more circuits as required to perform the operations of the modules 232-242.

In some embodiments, server device 200 may parse data and/or data packets to determine statuses of accounts attempting to secure event tickets. Further, server device may transmit such statuses to other accounts attempting to secure the same event tickets. In particular, processing module 234 of server device 200 may access first data packet 126 and second data packet 128 shown in FIG. 1. First data packet 126 may be associated with a first account and second data packet 128 may be associated with a second account. Further, status module 238 of server device 200 may determine from first data packet 126 a first status of the first account attempting to secure an event ticket. Yet further, status module 238 may further determine from second data packet 128 a second status of the second account attempting to secure the same event ticket. In addition, device module 240 of server device 200 may determine from first data packet 126 an identification of client device 104 accessing the first account, possibly attempting to secure the event ticket. Further, communication module 112 of server device 100 may transmit the second status of the second account to client device 104 accessing the first account.

Any of the modules 232-242 may be combined to take the form of one or more general purpose processors, microprocessors, and/or special purpose processors, among other types of processors. For example, the status module 238, the device module 240, and the event-ticket module 242 may be combined with the processing module 234, possibly such that the status module 238, the device module 240, and the event-ticket module 242 are combined with or within the processing module 234. Further, the combined processing module 234 may take the form of one or more processors, microprocessors, special purpose processors, DSPs, GPUs, FPUs, network processors, and/or ASICs, among other types of processing components. Yet further, the combined processing module 234 may be configured to carry out operations of the status module 238, the device module 240, and the event-ticket module 242, among other possible modules.

Figure 3A:
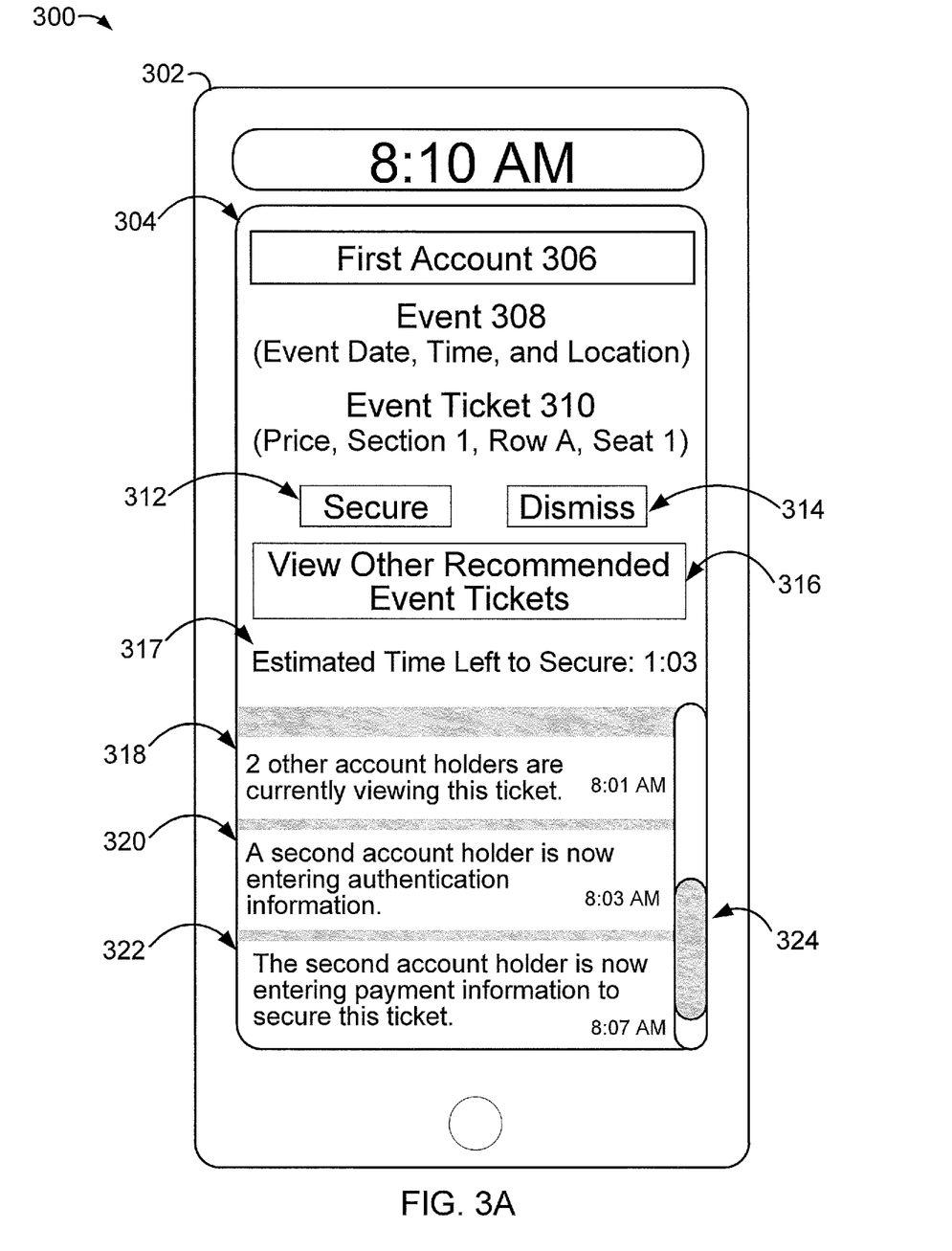
FIG. 3A is an exemplary user interface of a client device, according to an embodiment.

FIG. 3A is an exemplary user interface 302 of a client device 300, according to an embodiment. Client device 300 may, for example, take the form of any of the client devices described above in relation to FIG. 1. For example, consider that client device 300 takes the form of client device 104 and user interface 302 is displayed on client device 104, possibly as client device 104 accesses first account 306. As such, user interface 302 may include a display component configured to provide status 304 of first account 306.

As shown, user interface 302 may provide a time and/or a current time indicating, for example, "8:10 AM." User interface 302 may also provide the date and other information regarding client device 104, the battery level of client device 104, the connectivity level of client device 104, among other possibilities.

Status 304 of a first account 306 may be indicative of client device 104 requesting data associated with an event 308 and/or an event ticket 310. As such, client device 104 may send a request to server device 102 for the requested data via communication network 108. In particular, client device 104 may send the request in the form of a data packet, possibly similar to first data packet 126. As such, server device 102 may respond and provide the requested data to client device 104 via communication network 108. Server device 102 may also provide the requested data in the form of a data packet, possibly similar to packet 126. As such, client device 104 and server device 102 may communicate, and client device 104 may display data via user interface 302.

The requested data may be associated with a search for an event ticket, information corresponding to an event ticket, and/or or a request to purchase a specific event ticket for event 308. Further, the requested data may include the name of the venue, the event date, time of the event, the location of the venue, and/or parking information associated with the event. Further, the requested data may also be associated with event ticket 310 and may include price data for securing event ticket 310, section data indicating "Section 1," row data indicating "Row A," and/or seat data indicating "Seat 1." As shown, the account holder of first account 306 may further select option 312 to secure event ticket 310.

For example, by selecting an option 312, user interface 302 may provide prompts for login, prompts for payment information, and/or prompts for delivery information to secure event ticket 310. In some embodiments, the account holder may secure event ticket 310 by proceeding to check out and/or purchasing event ticket 310. In some instances, securing an event ticket may include entering login information to authenticate first account 306, entering purchasing information, entering delivery information, and/or filling out forms, among other possibilities. It should be noted that the account holder may only be required to enter such information once to secure event ticket 310 and/or other event tickets.

Further, the account holder may select an option 314 to dismiss event ticket 310. By selecting option 314, user interface 302 may provide search and/or browsing tools to identify other event tickets. Further, first account 306 may indicate an option 316 to view other recommended event tickets. It should be noted that the account holder of first account 306 may simply indicate one or more of options 312, 314, and/or 316 through touch sensing capabilities of client device 104.

As shown, user interface 302 provides an estimated time 317 that may be left to secure event ticket 310. For example, estimated time 317 may indicate "1:03" for one minute and three seconds left to secure event ticket 310. In some instances, estimated time 317 may be based on the average time an account holder takes to secure an event ticket after viewing an event ticket, entering authentication information, entering payment information, and/or entering delivery information. Further, estimated time 317 may be based on how long it takes the second account holder to secure an event ticket after viewing an event ticket, entering authentication information, entering payment information, and/or entering delivery information. For example, information regarding how long it takes the second account holder to secure event tickets may be stored with other information regarding the second account. Such information may include previous purchases by the second account holder, past event tickets purchased by the second account holder, and previous interests provided and/or indicated by the account holder.

In some instances, a probability of the account holder securing the event ticket may also be provided by user interface 302. For example, estimated time 317 may be represented as a probability or a percentage indicating the chances of the account holder in securing the event ticket. For example, the average time it takes the account holder to secure the event ticket may be compared with the average times of other account holders. In some instances, multiple other account holders may be viewing the same event ticket and these account holders may have shorter average times to secure event tickets. As such, user interface 302 may indicate a low probability of the account holder securing the event ticket. Yet, in some instances, user interface 302 may recommend event tickets with a high probability or percentage of the account holder securing the event tickets.

User interface 302 may also provide second statuses 318, 320, and 322 of a second account and/or other additional accounts attempting to secure event ticket 310. For example, the second account may be any other account different than first account 306. Status 318 may provide that "2 other holders are currently viewing this ticket" at a time indicating "8:01 AM." The first account holder of first account 306 may use this information before making a decision to select one or more of options 312, 314, and/or 316. Further, status 320 may provide, "A second account holder is now entering authentication information" at a time of "8:03 AM," possibly indicating that the second account holder is providing login information to the event-ticket service to secure event ticket 310. The first account holder may use this information and possibly elect option 316 to find other event tickets similar to event ticket 310. Yet further, status 322 may provide, "The second account holder is now entering payment information to secure this ticket" at a time indicating "8:07 AM." As such, the first account holder may elect option 316 to view other recommended event tickets, possibly similar to event ticket 310. Also shown is scroll bar 324 that may be used to view one or more of statuses 318-322, among statuses of accounts other than first account 306.

Referring back to FIG. 1, event-ticket database 110 may include or store event ticket data identifying a number of event tickets by, for example, price, section, row, and/or seat. Further, event-ticket module 122 may determine data associated with event ticket 310, possibly data indicating the price of event ticket 310, section 1, row A and seat 1, as noted above. Based on the data associated with event ticket 310, event-ticket module 122 may locate one or more other event tickets from the number of event tickets stored in event ticket-database 110.

For example, event-ticket module 122 may locate available event tickets that are similar to event ticket 310 based on price, section, row, and seat number. In addition, event-ticket module 122 may also locate event tickets using preferences stored for first account 306, possibly indicating past event tickets purchases, previous seats that the account holder has sat in for a previous event, price ranges of past event tickets purchased, and/or previous interests provided or indicated by the account holder.

Further, event ticket module 122 may locate event tickets that are not being viewed by other accounts. Yet further, event-ticket module 122 may locate event tickets that are not likely to be viewed by other accounts. For example, based on identifying other accounts interested in the particular event, e.g., accounts searching for event tickets, event-ticket module 122 may determine probabilities of the other account holders securing event tickets for the event, possibly based on preferences stored for the other accounts. Further, event-ticket module 122 may locate and recommend event tickets that first account 306 will have a better chance of securing. As such, the recommended tickets may be available to first account 306 via option 316.

In some instances, the other accounts viewing event tickets may be analyzed. Further, the preferences of these other accounts may be analyzed and/or evaluated. For example, previous purchases by the other accounts may indicate preferences in given sections, rows, and/or seats. As such, event-ticket module 122 may identify and/or locate event tickets with a lower probability of being purchased by these other accounts. As such, communication module 112 may transmit an indication of these event tickets to client device 104. Thus, client device 104 may display the indication of the one or more event tickets on the display component.

In some embodiments, the number of attempts by an account holder to secure an event ticket to a particular event may be tracked and/or recorded. For example, first account 306 may attempt to secure event ticket 310 and the second account holder may secure event ticket 310 before first account 306. Further, first account 306 may attempt to secure another event ticket and a third account holder may secure the event ticket before first account 306. As such, the server device may determine that first account 306 is attempting, e.g., for the third time, to secure an event ticket for a particular event. In such instances, the first account 306 may be allotted extra time to secure a recommended event ticket, possibly blocking other accounts from being able to view and/or attempt to secure the event ticket before first account 306.

Figure 3B:
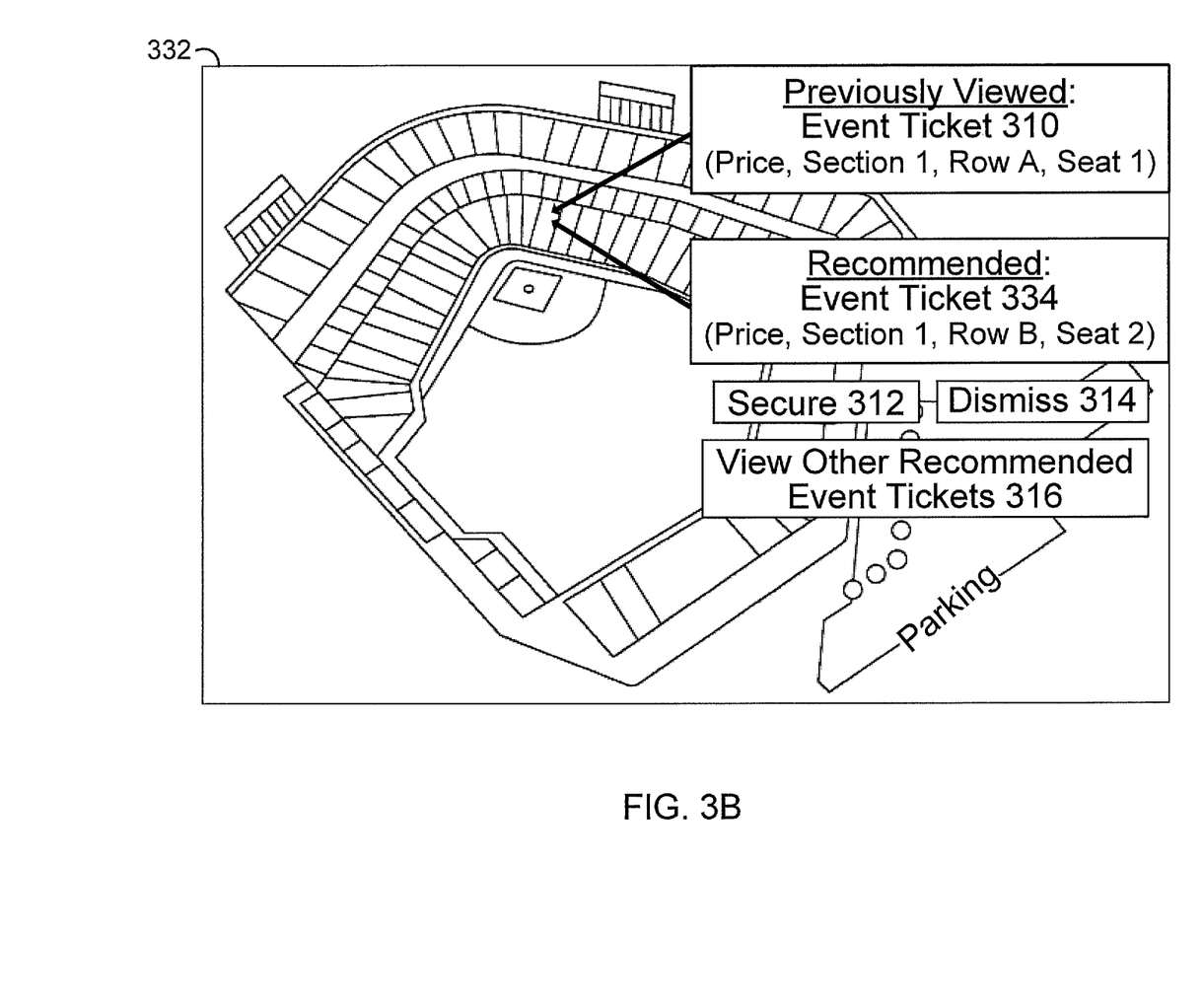
FIG. 3B is another exemplary user interface of a client device, according to an embodiment.

FIG. 3B provides another exemplary user interface 332 of client device 300, according to an embodiment. For example, further consider that client device 300 takes the form of first client device 104 and user interface 332 is displayed on client device 104, possibly after selecting an option 316 to view other recommended event tickets. As such, user interface 332 may provide "previously viewed" event ticket 310 and the details corresponding to event ticket 310 such as price, section 1, row A, and seat 1. In addition, user interface 332 may provide a "recommended" event ticket 334 and details corresponding to event ticket 334 such as the price to secure event ticket 334, section data indicating "Section 1," row data indicating "Row B," and/or seat data indicating "Seat 2." As such, the account holder of first account 306 may select option 312 to secure event ticket 334 or option 314 to dismiss event ticket 334. Yet further, the account holder may select option 316 to view other recommended event tickets.

Further, once the account holder has provided information (e.g., login information, payment information, and/or delivery information) to the event-ticket service to secure event ticket 310, the account holder may secure event ticket 334 without entering or re-entering such information. In some instances, this information may include one or more types of information the account holder enters in a checkout or payment process prior to event ticket 310 being sold and/or the account holder dismissing event ticket 310. As such, this information may be preserved for continuing a payment process for another event ticket, e.g., recommended event ticket 334, such that the account holder does not need to start or re-start a payment process from the beginning. As such, this may shorten the time required for the account holder to complete the process for securing an event ticket. Further, the chances of the account holder securing the event ticket before other account holders may increase significantly.

Figure 3C:
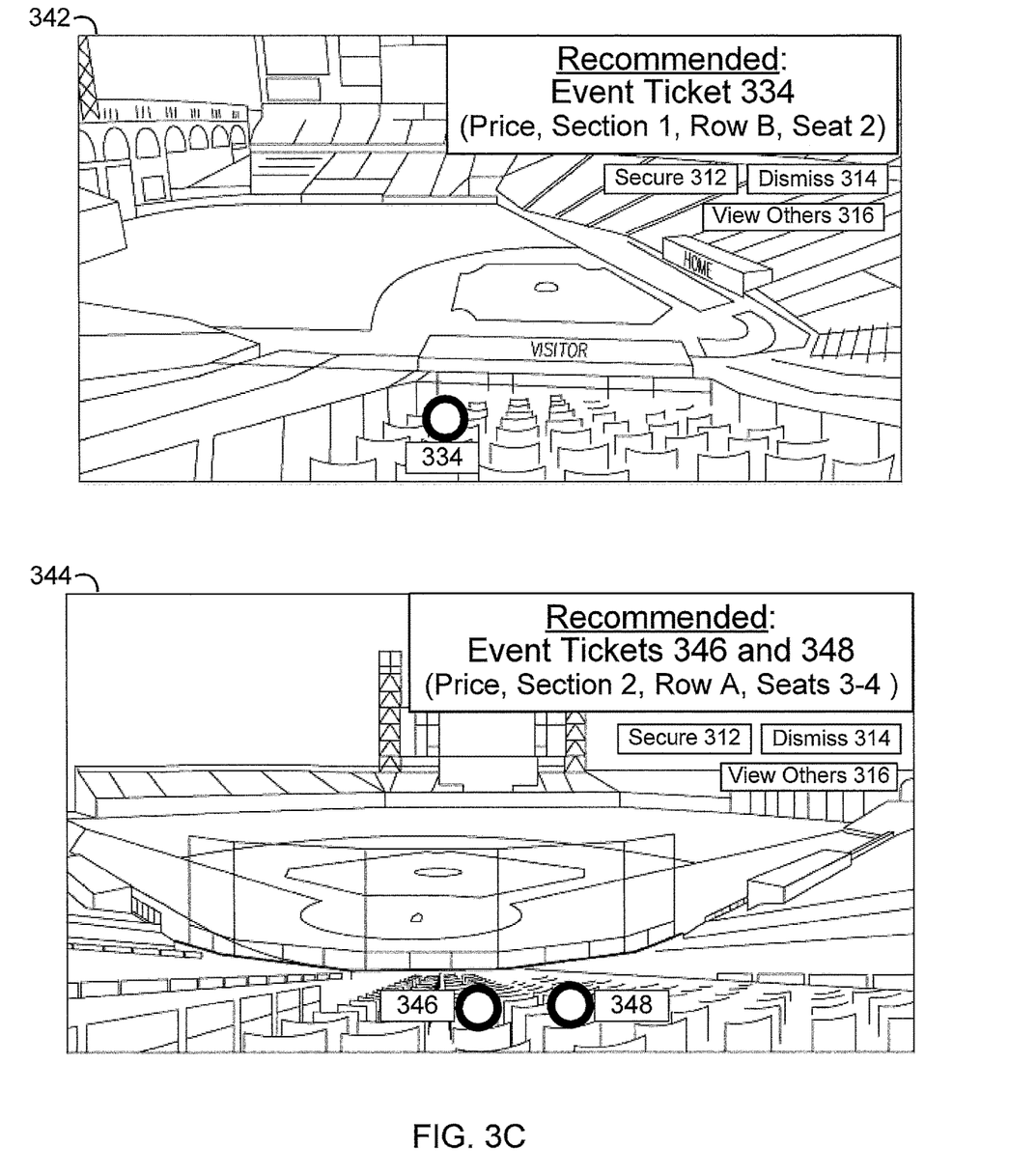
FIG. 3C provides additional exemplary user interfaces of a client device, according to an embodiment.

FIG. 3C provides additional exemplary user interfaces 342 and 344 of client device 300, according to an embodiment. As such, user interfaces 342 and 344 may be displayed on client device 104.

As shown, user interface 342 may provide a view from the seat associated with recommended event ticket 334 described above in relation to FIG. 3B. For example, the view may be a three-dimensional view from the seat. Further, user interface 342 may include details corresponding to event ticket 334 such as price, section 1, row B, and seat 2. As such, the account holder of first account 306 may select option 312 to secure event ticket 334 or option 314 to dismiss event ticket 334. Yet further, the account holder may select option 316 to view other recommended event tickets.

Further, user interface 344 may provide a view from multiple seats associated with recommended event tickets 346 and 348. For example, the view may include three-dimensional views from the seats. Further, user interface 344 may include details corresponding to event tickets 346 and 348 such as prices for each of event tickets 346 and 348 and/or possibly a single price for both event tickets 346 and 348. In addition, user interface 344 may provide details corresponding to section data indicating "Section 2," row data indicating "Row A," and/or seat data indicating "Seats 3-4." As such, the account holder of first account 306 may select option 312 to secure event tickets 346 and 348, or option 314 to dismiss event ticket 334. Yet further, the account holder may select option 316 to view other recommended event tickets.

It should be noted that once the account holder has provided information (e.g., login information, payment information, and/or delivery information) to the event-ticket service to secure event ticket 310, the account holder may secure event tickets 334, 346, and 348 without entering or re-entering such information.

Figure 4:
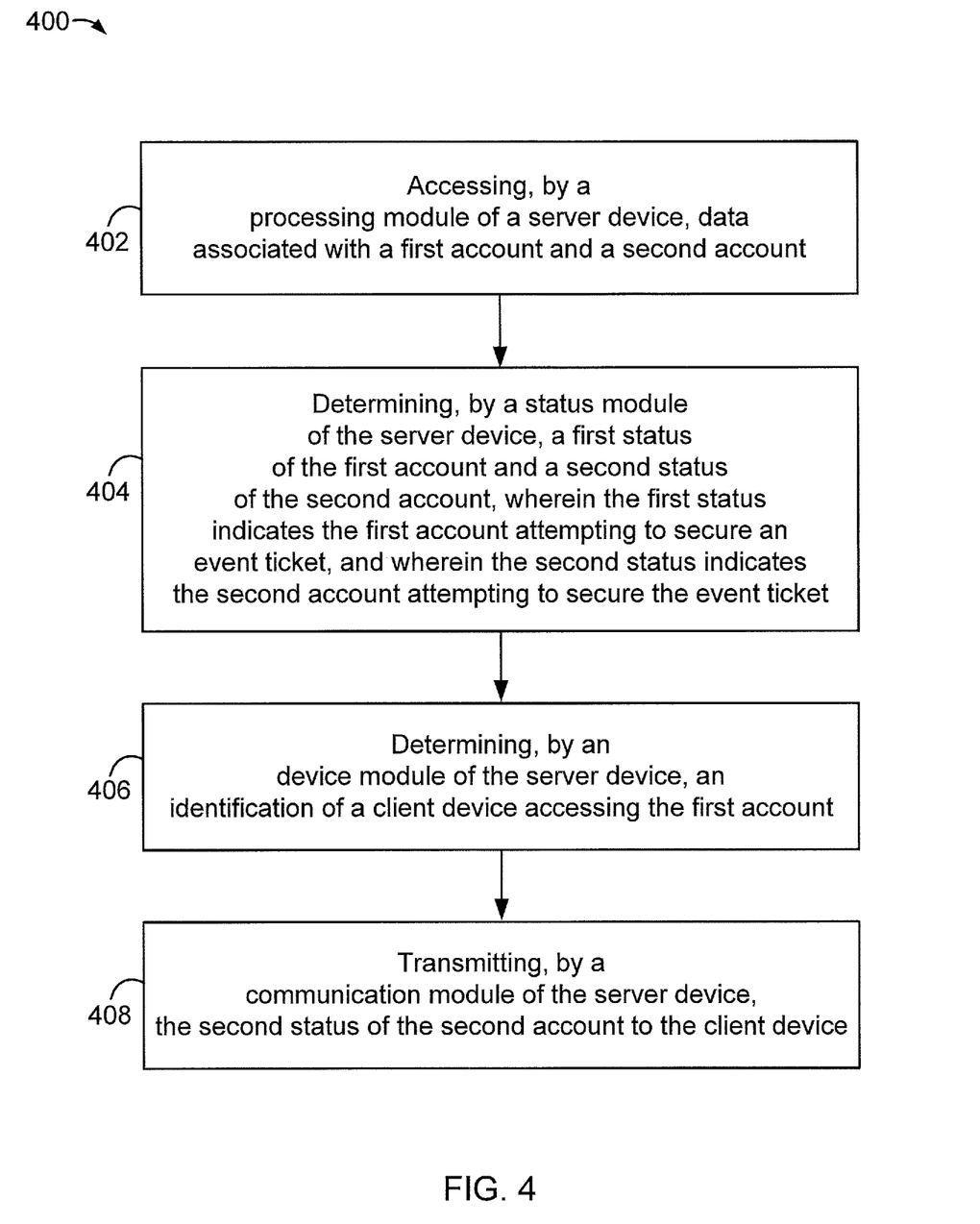
FIG. 4 is a flowchart of an exemplary method for transmitting the status of an account to a client device, according to an embodiment.

FIG. 4 is a flowchart of an exemplary method 400 for transmitting the status of an account to a client device, according to an embodiment. Note that one or more steps, processes, and methods described herein may be omitted, performed in a different sequence, and/or combined for various types of applications.

At step 402, method 400 includes accessing, by a processing module of a server device, data associated with a first account and a second account. For example, referring back to FIGS. 1-2, step 402 may include server device 102 accessing data associated with the first and second accounts. In some instances, server device 102 may access first and/or second data packets 126 and 128 from network nodes, network adapters, switches and/or routers in communication network 108. Yet further, step 402 may include processing module 234 of server device 200 accessing one or more data packets associated with a first account and a second account, respectively. For example, processing module 234 may access various data packet queues, buffers, and/or packet parsing registers.

At step 404, method 400 includes determining, by a status module of the server device, a first status of the first account and a second status of the second account, where the first status indicates the first account attempting to secure an event ticket, and where the second status indicates the second account attempting to secure the event ticket. For example, referring back to FIG. 2, step 404 may include status module 238 of server device 200 determining a first status of the first account and a second status of the second account. Further, status module 238 may determine the first and second statuses by analyzing the first and second data packets. Yet further, referring back to FIG. 3A, first status 304 may indicate first account 306 attempting to secure event ticket 310, and second statuses 320 and 322 may indicate the second account attempting to secure event ticket 310.

At step 406, method 400 includes determining, by a device module of the server device, an identification of a client device accessing the first account. For example, referring back to FIGS. 2 and 3, step 406 may include device module 240 determining an identification of client device 300 accessing first account 306. For example, device module 240 may determine one or more IP addresses of client device 300. Further, device module 240 may determine the one or more IP addresses through the event-ticket service sending and receiving data to the first account 306.

At step 408, method 400 includes transmitting, by a communication module of the server device, the second status of the second account to the client device. For example, referring back to FIG. 2 and FIG. 3A, step 408 may include communication module 232 of server device 200 transmitting second statuses 318-322 of the second account to client device 300. In such instances, the first status may be indicative of the client device requesting data associated with event ticket 306.

In some embodiments, the second status of the second account may vary, possibly when the second account is attempting to secure the event ticket. For example, the second status of the second account may be indicative of communication module 232 transmitting a request for authentication information to the second account. Further, the second status of the second account may be indicative of communication module 232 transmitting a request for payment information to the second account. Yet further, the second status of the second account may be indicative of communication module 232 transmitting confirmation information to the second account for securing the event ticket.

In addition, method 400 may include status module 238 comparing the first status of the first account and the second status of the second account. Based on the comparison, method 400 may include an event-ticket module 242 of server device 200 determining data associated with the event ticket. Based on the determined data, method 400 may include event-ticket module 242 locating one or more other event tickets in an event-ticket database of the server device. The method may include communication module 232 transmitting an indication of the one or more other event tickets to client device 300. For example, referring back to FIG. 3C, the indication may include a view from the seat associated with recommended event ticket 334, possibly a three-dimensional view from the seat. Yet further, the indication may include a view from multiple seats associated with recommended event tickets 346 and 348, possibly a three-dimensional view from the seats.

Figure 5:
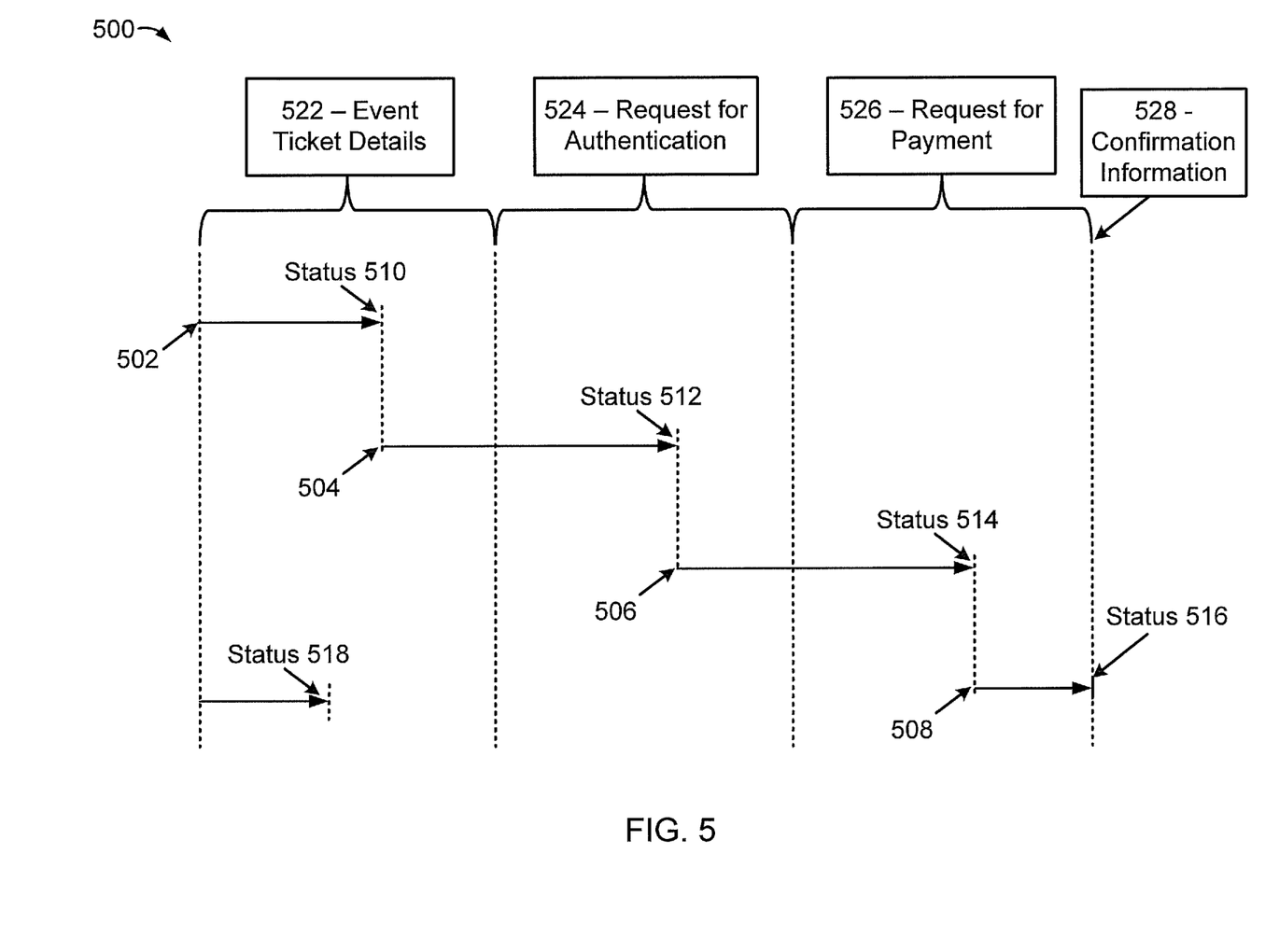
FIG. 5 is a status chart of an exemplary account, according to an embodiment.

FIG. 5 is a status chart 500 of an exemplary account, according to an embodiment. One or more of the steps described below may be performed in a sequence, omitted, and/or combined with steps 402-408 of method 400 described above in relation to FIG. 4. For example, as noted for step 408, the communication module of the server device may transmit the second status of the second account to the client device. The second status may correspond to any of the second statuses 510-516 described below. Further, status chart 500 may further be displayed on a user interface of the first and/or second client devices. For example, status chart 500 may indicate second statuses 510-516 ahead of first status 518 for securing event ticket 310. As such, status chart 500 may be displayed on user interface 302 of a client device 300 described above, possibly as first account 306 is attempting to secure event ticket 310.

At step 502, second status 510 of the second account attempting to secure the event ticket may be indicative of the communication module transmitting details 522 corresponding to the event ticket. Details 522 corresponding to the event ticket may include the price to secure the event ticket, the section, the row, and/or the seat indicated by the event ticket. Further, details 522 may indicate sending a request to the second account such that the second account may proceed to check out for securing the event ticket. In some instances, referring back to FIG. 1, communication module 112 may transmit details corresponding to the event ticket to second client device 106 via communication network 108. As such, status chart 500 may be displayed on user interface 130 of first client device 104, possibly showing second status 510 ahead of first status 518 of first account attempting to secure the event ticket.

At step 504, second status 512 of the second account attempting to secure the event ticket may be indicative of the communication module transmitting a request 524 for authentication information to the second account. Request 524 for authentication information may indicate sending a request to the second account such that login and password information may be provided to authenticate the second account. In some instances, referring back to FIG. 1, communication module 112 may transmit the request for authentication information to the second client device 106 via communication network 108. As such, status chart 500 may be displayed on user interface 130 of first client device 104, possibly showing second status 512 ahead of first status 518 of first account attempting to secure the event ticket.

At step 506, second status 514 of the second account attempting to secure the event ticket may be indicative of the communication module transmitting a request 526 for payment information to secure the event ticket for the second account. Request 526 for payment information may indicate sending a request to the second account such that the second account may provide credit card information, contact information, and/or delivery information for securing the event ticket and/or delivering the event ticket. In some instances, referring back to FIG. 1, communication module 112 may transmit the request for payment information to the second client device 106 via communication network 108. As such, status chart 500 may be displayed on user interface 130 of first client device 104, possibly showing second status 514 ahead of first status 518 of first account attempting to secure the event ticket.

At step 508, second status 516 of the second account attempting secure the event ticket is indicative of the communication module transmitting confirmation information 528 to the second account for securing the event ticket. Confirmation information 528 may include a bar code of the event ticket for admission to the event, a mobile ticket indicative of securing the event ticket, and/or a payment receipt indicative of securing the event ticket, among other possibilities. In some instances, referring back to FIG. 1, communication module 112 may transmit the confirmation information to the second client device 106 via communication network 108. For example, client device 106 may include a display component. Further, process 500 may include client device 106 displaying one or more of second statuses 510-516 of the second account on the display component. In addition, status chart 500 may be displayed on user interface 130 of first client device 104, possibly showing second status 516 ahead of first status 518 of first account attempting to secure the event ticket.

In some embodiments, a non-transitory computer-readable medium may store machine-readable instructions. For example, these instructions may be executed by a server device to cause the server device to perform operations. Referring back to FIG. 1, some operations may include accessing, by processing module 114 of server device 100, first data packet 126 and second data packet 128. First data packet 126 may be accessed from first client device 104 associated with a first account and second data packet 128 may be accessed from second client device 106 associated with a second account. For example, server device 100 may access first data packet 126 and/or second data packet 128 from a packet processing queue, possibly located in communication network 108. Further, the packet processing queue may be located in one or more network nodes and/or router buffers in communication network 108.

Further, some operation may include determining, by status module 118 of server device 102, a first status of the first account and a second status of the second account. The first status may indicate the first client device 104 attempting to secure an event ticket for the first account and the second status may indicate second client device 106 attempting to secure the event ticket for the second account.

Yet further, some operations may include determining, by device module 120 of server device 102, an identification of the first client device 104 accessing the first account and an identification of the second client device 106 accessing the second account. For example, data packets 126 and 128 may include IP addresses of client device 104 and 106, respectively. As such, device module 120 may retrieve the IP addresses from data packets 126 and 128 to determine the identifications of first and second client device 104 and 106.

In addition, some operations may include transmitting, by communication module 112 of server device 102, the second status of the second account to the first client device 104 and the first status of the first account to the second client device 106. In some embodiments, the second status of the second client device 106 attempting to secure the event ticket is indicative of the second client device 106 transmitting to server device 102 authentication information associated with the second account.

In some embodiments, the second status of the second client device 106 attempting to secure the event ticket is indicative of the second client device 106 transmitting to server device 102 payment information to secure the event ticket for the second account.

In some embodiments, the second status of the second client device 106 attempting to secure the event ticket is indicative of the second client device 106 receiving from server device 102 confirmation information for securing the event ticket for the second account.

In some embodiments, the first status may be indicative of the first client device 104 requesting data associated with the event ticket. Further, the second status may be indicative of second client device 106 transmitting to server device 102 authentication information associated with the second account. Yet further, the second status may be indicative of second client device 106 transmitting to server device 102 payment information to secure the event ticket for the second account. In addition, the second status may be indicative of the second client device 106 receiving from server device 102 confirmation information for securing the event ticket for the second account.

In some embodiments, the operation may include status module 118 comparing the first status of the first account and the second status of the second account. Based on the comparison, event-ticket module 122 of server device 102 may determine data associated with the event ticket. Further, based on the determined data, the operation may include event-ticket module 122 locating one or more other event tickets in event-ticket database 110 of server device 102. Yet further, the operation may include communication module 112 transmitting an indication of the one or more other event tickets to first client device 104. For example, referring back to FIG. 3C, the indication may include a view from the seat associated with recommended event ticket 334, possibly a three-dimensional view from the seat. Yet further, the indication may include a view from multiple seats associated with recommended event tickets 346 and 348, possibly a three-dimensional view from the seats.

In some embodiments, first client device includes a display component. Thus, the first client device may display the second status of the second account and the three-dimensional view from the seats associated with the one or more other event tickets on the display component.

In some embodiments, a system may include a processing module of a server device with means for accessing a first data packet associated with a first account and a second data packet associated with a second account. Further, a status module of the server device may include means for determining from the first data packet a first status of the first account attempting to secure an event ticket, where the status module further determines from the second data packet a second status of the second account attempting to secure the event ticket. Yet further, a device module of the server device may include means for determining from the first data packet an identification of a client device accessing the first account. In addition, a communication module of the server device may include means for transmitting the second status of the second account to the client device Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by the system 100. In various other embodiments of the present disclosure, a plurality of computer systems may be coupled by communication links to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a memory storing instructions; and
   one or more processors configured to execute the instructions to:
   access, in a server device, a first data packet associated with a first account and a second data packet associated with a second account;
   determine, from the first data packet, a first status of the first account, wherein the first account is attempting to secure an event ticket to at least one particular seat for an event;
   determine, from the second data packet, a second status of the second account, wherein the second account is attempting to secure the event ticket to the at least one particular seat;
   track a number of previously unsuccessful attempts by the first account to secure another event ticket to the event;
   determine, from the first data packet, an identification associated with a client device, the client device accessing the first account;
   direct, to the client device, at least one of:
      a status of the first account or the second account indicative of a time that the event ticket is expected to remain available to be secured for a respective one of the first account and the second account, and
      an option to view a recommended event ticket similar to the event ticket;
   direct, to a user interface in the client device, to display the at least one of the first status attempting to secure the event ticket to the at least one particular seat and the second status of the second account attempting to secure the event ticket to the at least one particular seat;
   allocate extra time that the event ticket is expected to remain available for the first account based on determining that a number of previously unsuccessful attempts by the first account satisfies a pre determined attempt threshold; and
   identify one or more other event tickets in an event ticket database based on the one or more other event tickets being available to secure and being similar to the event ticket in response to a selection of the option to view the recommended event ticket similar to the event ticket,
   wherein the status of the first account or the second account includes a percentage indicating a probability of the first account or the second account securing the event ticket, and
   wherein the probability of the first account or the second account securing the event ticket is based at least in part on an average time it takes an account holder to secure the event ticket compared with an average time of multiple account holders.

2. The system of claim 1, wherein the first status of the first account is indicative of a client device request for a data associated with the event ticket.

3. The system of claim 2, wherein the data associated with the event ticket includes at least one following type of data comprising: venue location data, event date data, event time data, section data, row data, and seat data.

4. The system of claim 2, wherein a status of the second account is indicative of a payment data by the second account, to secure the event ticket.

5. The system of claim 1, wherein the one or more processors further execute instructions to transmit, to the client device, an indication of the one or more other event tickets.

6. A method comprising:
   accessing, by a server device, data associated with a first account and a second account;
   determining, by the server device, a first status of the first account, and a second status of the second account,
   wherein the first status indicates the first account attempting to secure an event ticket to at least one particular seat for an event, and
   wherein the second status indicates the second account attempting to secure the event ticket to the at least one particular seat;
   determining, by the server device, an identification of a client device accessing the first account;
   tracking, by the server device, a number of previously unsuccessful attempts by the first account to secure another event ticket to the event;
   determining, by the server device, that the previously unsuccessful number of attempts by the first account satisfies a pre-determined attempt threshold;
   transmitting, by the server device, to the client device, at least one of:
      the first status of the first account and the second status of the second account, the at least one of the first status and the second status indicating at least an estimated time that the event ticket is expected to remain available to be secured for a respective one of the first account and second account, and
      an option to view a recommended event ticket similar to the event ticket;
   directing, by the server device, the client device to display the at least one of the first status attempting to secure the event ticket to the at least one particular seat and the second status attempting to secure the event ticket to the at least one particular seat;
   allocating, by the server device, extra time that the event ticket is expected to remain available for the first account based on determining that the number of previously unsuccessful attempts by the first account satisfies the pre-determined attempt threshold; and
   in response to a selection of the option to view the recommended event ticket similar to the event ticket, identifying, by the server device, one or more other event tickets in an event-ticket database based on the server device determining the one or more other event tickets are available to secure and are similar to the event ticket, wherein the estimated time that the event ticket is expected to remain available to be secured for the first account and the second account includes a percentage indicating a probability of the first account or the second account securing the event ticket, and wherein the probability of the first account or the second account securing the event ticket is based at least in part on an average time it takes an account holder to secure the event ticket compared with an average time of multiple account holders.

7. The method of claim 6, wherein the second status of the second account attempting to secure the event ticket is indicative of the server device transmitting a request for authentication information to the second account.

8. The method of claim 6, wherein the second status of the second account attempting to secure the event ticket is indicative of the server device transmitting a request for payment information to secure the event ticket for the second account.

9. The method of claim 6, wherein the second status of the second account attempting secure the event ticket is indicative of a confirmation information transmitted by the server device to the second account for securing the event ticket.

10. The method of claim 6, wherein the first status of the first account is indicative of the client device requesting data associated with the event ticket, and wherein the second status of the second account is indicative of at least one of:
the server device transmitting a request for authentication information to the second account,
the server device transmitting a request for payment information to the second account, and
a confirmation information transmitted by the server device to the second account for securing the event ticket.

11. The method of claim 10, wherein determining that the one or more other event tickets are similar to the event ticket includes:
comparing the first status of the first account and the second status of the second account; and
based on the comparing, determining the data associated with the event ticket,
wherein the one or more other event tickets are determined to be similar to the event ticket based on the data associated with the event ticket,
wherein the method further comprises transmitting an indication of the one or more other event tickets to the client device, and
wherein the indication includes a view from seats associated with the one or more other event tickets.

12. A non-transitory computer-readable medium having stored thereon machine-readable instructions that, when executed by a server device, cause the server device to perform operations comprising:
accessing, by the server device, a first data packet and a second data packet,
wherein the first data packet is accessed from a first-client device associated with a first account, and
wherein the second data packet is accessed from a second-client device associated with a second account;
determining, by the server device, a first status of the first account and a second status of the second account, wherein the first status indicates the first-client device attempting to secure an event ticket to at least one particular seat for an event for the first account, and
wherein the second status indicates the second-client device attempting to secure the event ticket to the at least one particular seat for the second account;
determining, by the server device, an identification of the first-client device accessing the first account and an identification of the second-client device accessing the second account;
tracking, by the server device, a number of previously unsuccessful attempts by the first account to secure another event ticket to the event;
determining, by the server device, that the number of previously unsuccessful attempts by the first account satisfies a pre-determined attempt threshold;
transmitting, by the server device, the second status of the second account to the first-client device and the first status of the first account to the second-client device, at least one of the first status of the first account and second status of the second account indicating at least an estimated time that the event ticket is expected to remain available to be secured for the first account and second account, and an option to view a recommended event ticket similar to the event ticket, both the first status attempting to secure the event ticket to the at least one particular seat and the second status attempting to secure the event ticket to the at least one particular seat being available to display in a user interface at each of the first-client device and the second-client device;
directing, by the server device, the first-client device to display both the first status attempting to secure the event ticket to the at least one particular seat and the second status attempting to secure the event ticket to the at least one particular seat;
allocating, by the server device, extra time that the event ticket is expected to remain available for the first account based on determining that the number of previously unsuccessful attempts by the first account satisfies the pre-determined attempt threshold; and
in response to a selection of the option to view the recommended event ticket similar to the event ticket, identifying, by the server device, one or more other event tickets in an event-ticket database based on the server device determining the one or more other event tickets are available to secure and are similar to the event ticket,
wherein the estimated time that the event ticket is expected to remain available to be secured for the first account and the second account includes a percentage indicating a probability of the first account or the second account securing the event ticket, and wherein the probability of the first account or the second account securing the event ticket is based at least in part on an average time it takes an account holder to secure the event ticket compared with an average time of multiple account holders.

13. The non-transitory computer-readable medium of claim 12, wherein the second status of the second-client device attempting to secure the event ticket is indicative of an authentication information associated with the second account transmitted from the second-client device to the server device.

14. The non-transitory computer-readable medium of claim 12, wherein the second status of the second-client device attempting to secure the event ticket is indicative of the second-client device transmitting, to the server device, a payment information to secure the event ticket for the second account.

15. The non-transitory computer-readable medium of claim 12, wherein the second status of the second-client device attempting to secure the event ticket is indicative of the second-client device receiving, from the server device, a confirmation information for securing the event ticket for the second account.

16. The non-transitory computer-readable medium of claim 12, wherein the first status is indicative of the first-client device requesting a data associated with the event ticket, and
wherein the second status is indicative of at least one of:
the second-client device transmitting, to the server device, an authentication information associated with the second account,
the second-client device transmitting, to the server device, a payment information to secure the event ticket for the second account, and
the second-client device receiving, from the server device, a confirmation information for securing the event ticket for the second account.

17. The non-transitory computer-readable medium of claim 12, wherein determining that the one or more other event tickets are similar to the event ticket includes:
comparing the first status of the first account and the second status of the second account; and
based on the comparing, determining a data associated with the event ticket,
wherein the one or more other event tickets are determined to be similar to the event ticket based on the data,
wherein the operations further comprise transmitting an indication of the one or more other event tickets to the first-client device, and
wherein the indication includes a three-dimensional view from seats associated with the one or more other event tickets.

18. The non-transitory computer-readable medium of claim 17, wherein the first-client device comprises a display component, and
wherein the first-client device displays the second status of the second account and the three-dimensional view from the seats associated with the one or more other event tickets on the display component.

19. The method of claim 6, wherein the allocating of the extra time further comprises blocking the second account from viewing data associated with the event ticket for a period equal to the extra time.

20. The method of claim 6, wherein the allocating of the extra time further comprises blocking the second account from attempting to secure the event ticket for a period equal to the extra time.

* * * * *